(12) United States Patent
Vlacancich

(10) Patent No.: US 6,636,602 B1
(45) Date of Patent: Oct. 21, 2003

(54) METHOD FOR COMMUNICATING

(76) Inventor: Giovanni Vlacancich, 14-36 132nd St., College Point, NY (US) 11356

( * ) Notice: Subject to any disclaimer, the term of this patent is extended or adjusted under 35 U.S.C. 154(b) by 0 days.

(21) Appl. No.: 09/383,098

(22) Filed: Aug. 25, 1999

(51) Int. Cl.[7] .............................. H04M 1/00; H04M 3/00
(52) U.S. Cl. .............................. 379/374.01; 379/142.01; 379/373.03; 340/7.57; 84/609; 84/649
(58) Field of Search ........................ 379/142.01, 142.04, 379/142.06, 373.01, 373.02, 373.03, 373.04, 374.01, 374.02; 340/7.57, 7.62; 84/600, 609, 649

(56) References Cited

U.S. PATENT DOCUMENTS

| | | | | |
|---|---|---|---|---|
| 4,463,221 A | * | 7/1984 | Soulliard et al. | 455/554.1 |
| 4,480,153 A | * | 10/1984 | Festa | 379/374.01 |
| H118 H | * | 9/1986 | Biggs et al. | 379/88.16 |
| 4,655,117 A | * | 4/1987 | Roose | 84/423 B |
| 4,707,855 A | * | 11/1987 | Pasinski et al. | 379/376 |
| 4,731,847 A | * | 3/1988 | Lybrook et al. | 384/51 |
| 4,833,709 A | * | 5/1989 | Pasinski et al. | 379/374 |
| 4,856,055 A | * | 8/1989 | Schwartz | 379/374 |
| 5,153,829 A | * | 10/1992 | Furuya et al. | 364/419 |
| 5,208,852 A | * | 5/1993 | Tamura et al. | 379/353 |
| 5,481,594 A | * | 1/1996 | Shen et al. | 379/67 |
| 6,075,998 A | * | 6/2000 | Morishima | 455/567 |
| 6,308,086 B1 | * | 10/2001 | Yoshino | 455/567 |
| 6,411,198 B1 | * | 6/2002 | Hirai et al. | 340/7.6 |
| 6,472,591 B2 | * | 10/2002 | Aoki et al. | 84/611 |
| 2002/0058521 A1 | * | 5/2002 | Yamada et al. | 455/458 |
| 2002/0066359 A1 | * | 6/2002 | Kawashima | 84/622 |
| 2003/0012361 A1 | * | 1/2003 | Yoshimura | 379/373 |
| 2003/0013432 A1 | * | 1/2003 | Fukaya | 455/412 |

* cited by examiner

Primary Examiner—Binh Tieu
(74) Attorney, Agent, or Firm—Muserlian, Lucas and Mercanti

(57) ABSTRACT

The method entails assigning each letter in an alphabet a musical note, converting words in a message into the musical notes and then using the musical notes to communicate the message to another human being. Different instruments are used to play the musical notes. One specific use of the method is as a programmable telephone ringer device which has a receiver for receiving an incoming call and a decoder, connected to the receiver for decoding the incoming call into a plurality of digits. These digits are matched against a lookup table by a tone generating means and a corresponding output signal is produced. The output signal is then sent to a speaker to alert a user that an incoming call has been received. The user can distinguish between incoming calls based on the pattern of sounds.

22 Claims, 4 Drawing Sheets

| INTEGERS/FREQ./NOTE | ROMAN/FREQ./NOTE | HEBREW/FREQ./NOTE | GREEK/FREQ./NOTE | RUSSIAN/FREQ./NOTE |
|---|---|---|---|---|
| 0 16.17 C | A 32.33 C | א 32.33 C | A 32.33 C | A 32.33 C |
| 1 17.13 C# | B 34.25 C# | ב 34.25 C# | B 34.25 C# | Б 34.25 C# |
| 2 18.15 D | C 36.29 D | ג 36.29 D | Γ 36.29 D | В 36.29 D |
| 3 19.22 D# | D 38.45 D# | ד 38.45 D# | Δ 38.45 D# | Г 38.45 D# |
| 4 20.37 E | E 40.74 E | ה 40.74 E | E 40.74 E | Д 40.74 E |
| 5 21.58 F | F 43.16 F | ו 43.16 F | Z 43.16 F | E 43.16 F |
| 6 22.86 F# | G 45.72 F# | ז 45.72 F# | H 45.72 F# | Ж 45.72 F# |
| 7 24.22 G | H 48.44 G | ח 48.44 G | θ 48.44 G | З 48.44 G |
| 8 25.66 G# | I 51.32 G# | ט 51.32 G# | I 51.32 G# | И 51.32 G# |
| 9 27.19 A | J 54.37 A | י 54.37 A# | K 54.73 A | К 54.37 A |
| | K 57.61 A# | כ 57.61 A# | Λ 57.61 A# | Л 57.61 A# |
| | L 61.03 B | ל 61.03 B | M 61.03 B | M 61.03 B |
| | M 64.66 C | פ 64.66 C | N 64.66 C | H 64.66 C |
| | N 68.51 C# | נ 68.51 C# | Ξ 68.51 C# | O 68.51 C# |
| | O 72.58 D | ם 72.58 D | O 72.58 D | П 72.58 D |
| | P 76.90 D# | ע 76.90 D# | Π 76.90 D# | P 76.90 D# |
| | Q 81.74 E | פ 81.74 E | P 81.74 E | C 81.84 E |
| | R 86.31 F | צ 86.31 F | Σ 86.31 F | T 86.31 F |
| | S 91.45 F# | ק 91.45 F# | T 91.45 F# | У 91.45 F# |
| | T 96.89 G | ר 96.89 G | T 96.89 G | Ф 96.89 G |
| | U 102.65 G# | ש 102.65 G# | Φ 102.65 G# | X 102.65 G# |
| | V 108.75 A | ש 108.75 A | X 108.75 A | Ц 108.75 A |
| | W 115.22 A# | ת 115.22 A# | Ψ 115.22 #A | Ч 115.22 A# |
| | X 122.07 B | | Ω 122.07 B | Ш 122.07 B |
| | Y 129.33 C | | | Щ 129.33 C |
| | Z 137.02 C# | | | Ъ 137.02 C# |
| | | | | Ы 145.16 D |
| | | | | Ь 153.80 D# |
| | | | | Э 162.94 E |
| | | | | Ю 172.63 F |
| | | | | Я 182.89 F# |

FIG. 1

METHOD FOR COMMUNICATING

BACKGROUND OF THE INVENTION

1. Field of the Invention

The present invention relates to a method for communicating and, more particularly, to a method of using musical notes for communicating wherein each letter in the alphabet is assigned a musical note. One of the particular applications of the present invention is with a telephone.

2. Art Related to the Invention

Most animals communicate through sound, some being more complex than others. Man has often tried to string words together to create a pleasant sound while communicating a message. Poetry and song are probably two of the most common forms of communication which not only conveys a message, but are also enjoyable to the ear. One area that is woefully deficient in this area is the telecommunication field.

The classic method for indication of an incoming telephone call has been the electromechanical bell. More recently, electronically driven sounding devices have begun to replace the electromechanical bell. Both methods, however, fail to convey the identity of the caller or to provide a message which is pleasant to the ear.

Attempts have been made to provide a message which is more pleasant to the ear. U.S. Pat. No. 4,727,572 to Whitney discloses a telephone annunciator with low battery indication. The purpose of the device is to provide a gentler method for drawing attention to an incoming call. The device replaces the conventional ringer with a musical passage, chimes, a short voice message, a flashing light or the sound of a waterfall. The device supplies an output signal which activates an external signaling device such as a tape player, chime, music box or voice chip. The device does not distinguish between incoming calls and does not allow the user to program or record the type of sound generated.

Similarly, U.S. Pat. No. 4,480,153 to Festa discloses a musical-output adapter for telephones. The device replaces the ringing of the bell by providing a musical tune or melody when the telephone is activated by a caller. The user selects one of several programmed tunes or melodies to play until the phone is either answered or the caller hangs up. The device does not distinguish between incoming calls and does allow the user to record sample sounds.

U.S. Pat. No. 5,265,145 to Lim discloses an alphanumeric caller identification telephone which can not only display the received number, but can also spell, speak or display the name of the caller for predetermined incoming calls. In addition, the device can be set to ring, alert or even activate a plurality of control outputs when certain incoming calls including a number or name are received. The device is limited to the names and numbers stored in memory, and does not allow the user to record sample sounds.

Lastly, U.S. Pat. No. 4,894,861 to Fujioka discloses a terminal in communication network for notifying the originating party's number. Like the Lim patent, this device compares the incoming call with a pre-registered list of callers and notifies the user of the incoming call via an audible indication of the ID information corresponding to the registered subscriber's number.

None of the devices are capable of distinguishing between incoming calls that are not pre-registered with a musical note that corresponds to a letter in the alphabet. In addition, none of the devices allow the user to assign musical notes for each letter of the alphabet, so that the user can communicate with musical notes and distinguish one incoming call from another through a musical note.

SUMMARY OF THE INVENTION

The present invention is a new method for communicating, namely, it assigns each letter in the alphabet a musical note such that each unique combination of letters will have a separate note associated therewith.

The present invention is primarily intended for Roman alphabet, A to Z, however, it can be applied to any language which employs an alphabet, finite set of letters, to form words. For example, the present invention can be employed in the Hebrew, Arabic, Greek, Russian or Sanskrit alphabets.

Preferably, each positive integer from 0 to 9 is also assigned a unique musical note, one that is different than the musical notes assigned to the letters in the alphabet. The present invention is intended for Arabic, positive, single integers, 0 to 9, however, the present invention can also be adapted for Roman numbers, i.e. I, V, X, L, C, D and M.

Preferably, other symbols such as periods (.), full colons (:), semicolons (;), comas (,), question marks (?), plus (+), and minus (−) could also be assigned unique musical notes, notes different than those assigned to the letters and numbers.

Musical notes played by different instruments have the same frequency but have a different sound. Thus, a specific instrument can be employed to distinguish one letter or number from another, thereby creating unique musical sounds.

The notes can also be divided into halfs, quarters, eighths, sixteenths, etc., to distinguish one from another. Depending on the number of musical notes employed, the musical notes will be. separated one from another.

Broadly, the method of the present invention comprises:
(a) assigning one musical note to each letter in an alphabet;
(b) converting each letter in a word of a message to its assigned musical tone; and
(c) communicating said message to a human being using said musical notes.

The piano has 88 keys which are audible and distinguishable to the average human ear, thus, by using the keyboard on the piano, the notes provided by 26 keys can be assigned to the Roman alphabet to accomplish the first step of the present invention.

Alternatively, every other key of the middle 52 keys on the piano can be used and assigned to the Roman alphabet to accomplish the first step of the present invention.

The present invention also provides a device for a Programmable Telephone Ringer that is capable of distinguishing between all incoming calls and notifying the user accordingly by employing the method of the present invention.

The present invention allows the user to program and record unique musical notes for each letter of the alphabet.

The present invention also provides a device which is both portable and inexpensive to manufacture.

BRIEF DESCRIPTION OF THE DRAWINGS

These and other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a table of the Roman, Hebrew, Greek and Russian alphabets and Arabic integers 0 to 9 with assigned musical notes by frequencies;

DETAILED DESCRIPTION OF THE INVENTION

Figure 2:
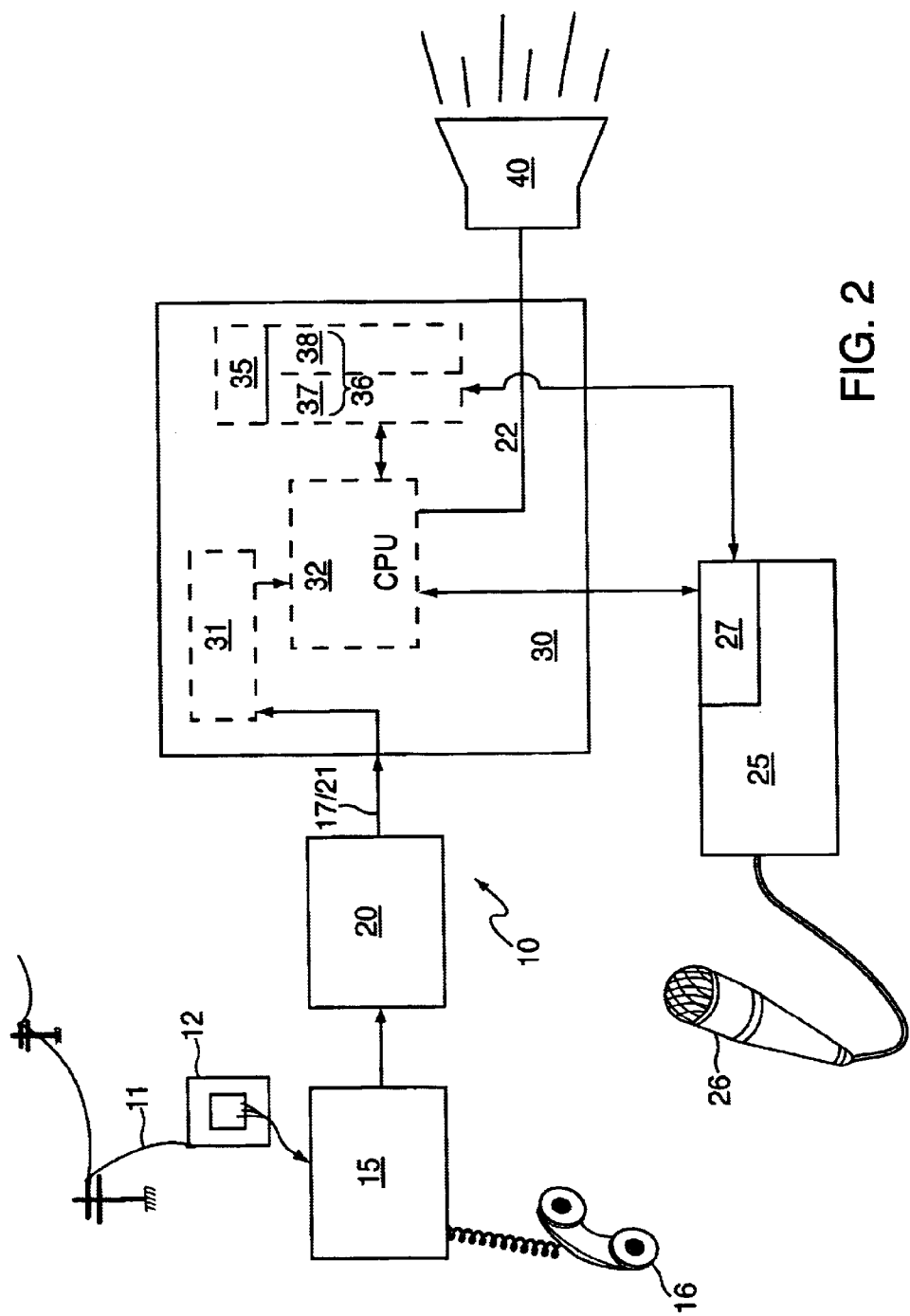
FIG. 2 is a block diagram of the present invention.

As shown in FIG. 1, each of the alphabets, Roman, Hebrew, Greek and Russian, has been given an evenly spaced, specific frequency which corresponds to a musical note. Each of these musical notes are within the audible range for human beings. Since humans generally do not use two alphabets to communicate in, thus, the four alphabets overlap. The integers, 0 to 9, do not overlap any of the alphabets.

The audible range of frequency for most humans is 16 to 20,000 hertz (CPS). Most instruments operate in the range of about 20 to 10,000 hertz. It is preferred to use the middle. range where the piano operated in the range of about 100 to about 5,000 hertz.

The intensity level of the musical note must be in the audible range. As is known, the audible range for intensity varies based on the frequency. At higher frequencies (10,000 hertz), the intensity ranges from about 20 db to about 140 db while at lower frequencies (20 hertz), the intensity ranges from about 60 db to about 130 db. It is preferred to operate inside these ranges.

It is also preferred to space the musical notes used a distance apart to make it easier to understand for the listener.

Presumably, recognizable musical notes are used, such as the middle 26 keys on a piano keyboard.

In FIG. 1, musical notes by frequencies have been assigned in numerical order, i.e. low to high. There is no need to specifically use the format of ascending or descending order for each of the letters in the alphabet. For example, Roman A can be 137.02 hertz while Roman,B is 115.22 and Roman C 122.07. Thus, these letters are not in ascending or descending order, but rather, a random order. Preferably, however, some order is employed, e.g. ascending or descending, rather than random, to make it easy to understand. The corresponding musical note has also been entered in FIG. 1. As is shown, the alphabet spans a plurality of octaves. Each octave comprises 12 notes C, C#, D, D#, E, F, F#, G, G#, A, B and C. These are the ones for a piano keyboard. The # symbol starts for a sharp. Any variation of musical notes can be used, provided there is a distinct musical note such for each letter in the alphabet.

FIG. 1 is based on an International scale where A3—435 hertz. Today, generally A3 is 440 hertz. As mentioned above, any scale can be employed for the musical notes used in the present invention.

Communication in accordance with the present invention is accomplished by putting together the musical notes and then to emit the note long enough to be perceived by the human ear before moving on to the next musical note. Obviously, the listener has to know the language, musical notes, and be able to associate them with the appropriate alphabet.

Any conventional means can be employed for emitting the musical note. For example, a musical instrument, or the human voice. The receiving means is a human ear, but a recording device can be employed to either preserve the message or to act as a medium to fix the notes and allow them to be heard at another time, a time other than when they are produced. For example, one composes a letter to another using musical notes which have been fixed on an audio cassette and then mailed to another. The receiver then plays the tape to receive the message.

Different musical instruments can be employed to distinguish one letter/number from another. Thus, a trumpet and a piano can play the same musical note but the musical notes played by each instrument will sound different due to the instrument itself. Where different musical instruments have been used to distinguish one letter from another, that same instrument must be used to play back or communicate the message. Where each letter is assigned a musical note without regard for the instrument, any instrument, or mix of instruments can be used to play back or communicate the message.

Turning now to a specific embodiment of the present invention, FIG. 2 shows a block diagram of one preferred embodiment of the present invention. The device for a programmable telephone ringer 10 comprises a phone jack 12 mounted inside a user's home which is connected to standard telephone lines provided by the local telephone company. A means for receiving 15 an incoming signal 11 is connected to phone jack 12. A standard telephone 16 is also connected to receiving means 15. The telephone permits the user to speak with the caller. In addition, it is understood that several other devices may be attached to receiving means 15 such as an answering machine, computer, or voice mail. Receiving means 15 transmits incoming signal 11 to a decoding means 20, wherein decoding means 20 converts incoming signal 11 into a plurality of data 21 and transfers data 21 to a tone generating means 30. Data 21 is divided into a plurality of individual digits 17, letters in the alphabet or integers 0 to 9.

Tone generating means 30 further comprises temporary storage means 31 for storing data 21. Data 21 is compared, via a microprocessor controller 32, to similar data stored in a lookup table 36 on a permanent storage means 35. Permanent storage means 35 may be a hard disk, a programmable read only memory PROM, or other suitable programmable, nonvolatile storage device. Lookup table 36 stores a copy of all possible incoming data 37 and a copy of its corresponding recorded sound 38.

Controller 32 matches each digit 17 of incoming data 21 with the corresponding data 37 in lookup table 36 and generates an output signal 22 equal to that of recorded sound 38. Output signal 22 is then sent to a speaker 40 to alert the user that a call has been received.

A tone recorder circuit 25 is connected to tone generator means 30 and comprises means for accessing 27 specific data 37 in lookup table 36 and means for recording 26 recorded sound 38. In order to change a sound for a specific character of data in table 36, the user enters the character via accessing means,27 and records recorded sound 38 via recording means 26. Recording means 26 may be either an internal or external microphone or other device suitable for recording sounds. Recorded sound 38 is then stored on permanent storage means 35 in table 36. The present invention enables a user to record a unique sound for a wide range of data 37. Thus, the individual musical tones are entered into circuit 25 via means 26. For example, a user can play his/her piano to enter the appropriate tone for each integer 0 to 9 and each letter of the alphabet, e.g. A to Z. The incoming message would then be played out using the inputted musical tones.

Figure 3:
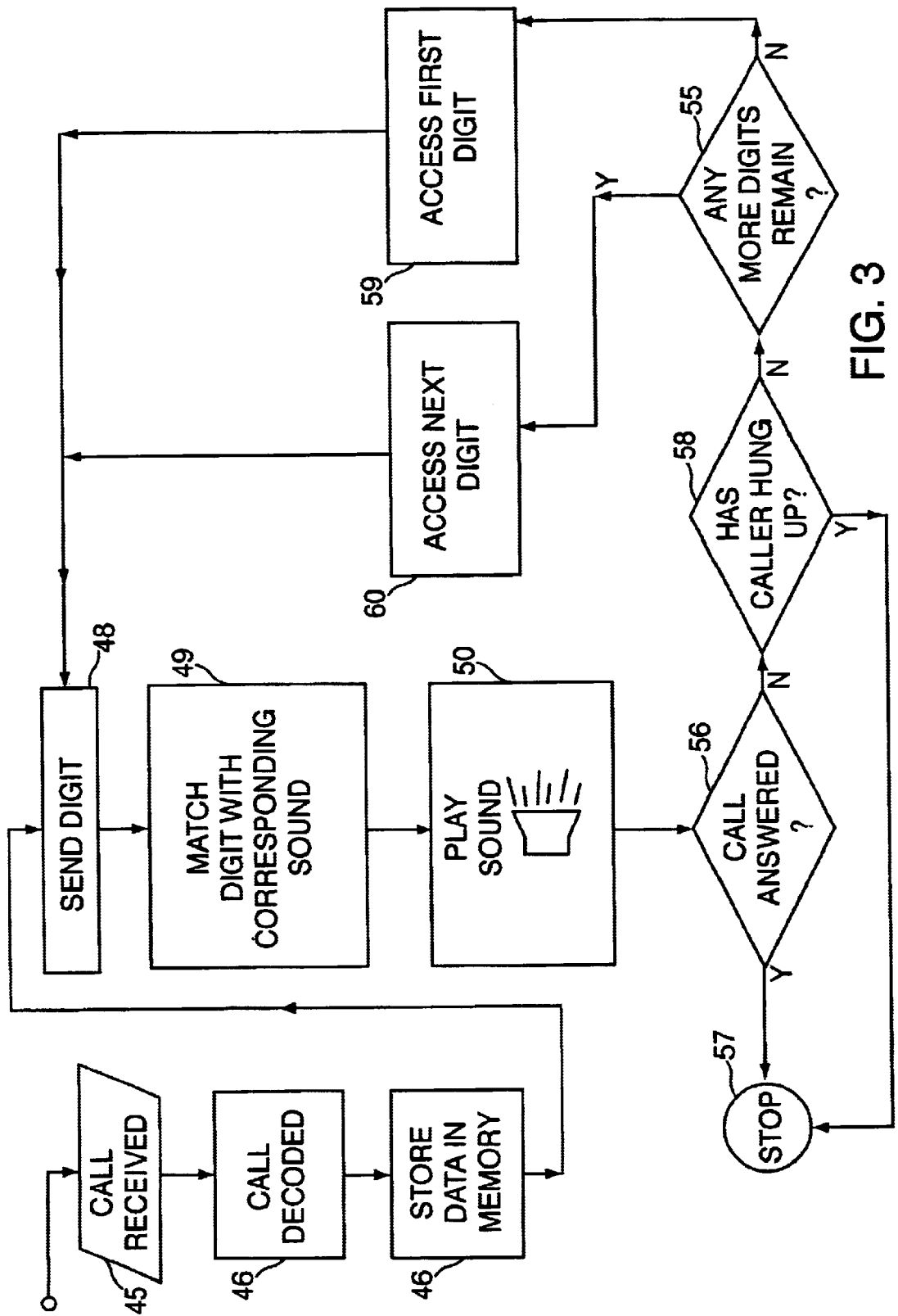
FIG. 3 is a flow diagram of the tone generating sequence.

Referring to FIG. 3, there is shown a flow diagram of the present invention as illustrated in FIG. 2. A call is received 45 and decoded 46 into data consisting of a plurality of digits. The output data is stored 47 in temporary memory. The first digit of the stored data is sent 48 to a controller where it is matched 49 against a lookup table containing a copy of all possible digits (letters in the alphabet and integers 0 to 9) and the corresponding sounds (musical notes). The controller determines which sound to play based on the matched data. The unique sound is then played 50 via a speaker. The controller next determines whether the call has been answered by the user 56. If yes, the process stops 57. If not, the controller determines whether the caller has hung up 58. If yes, the process stops 57. If not, the controller must determine if there are any additional digits of data present 55. If yes, the controller will access the next digit 60 stored in memory and send 48 the digit to be matched 49. The matching and playing of the sound repeats. If there are no more digits remaining, after step 55, the controller will access 59 the first digit of saved data and send 48 the digit to be matched 49. The matching and playing of the sound repeats until either the call has been answered 56 or the caller hangs up 58.

In this manner, the user is able to distinguish between incoming calls and decide whether to answer the phone based on the pattern of sounds generated. This is a call-identification type system which is just one of the many device that can employ the present invention.

Figure 4:
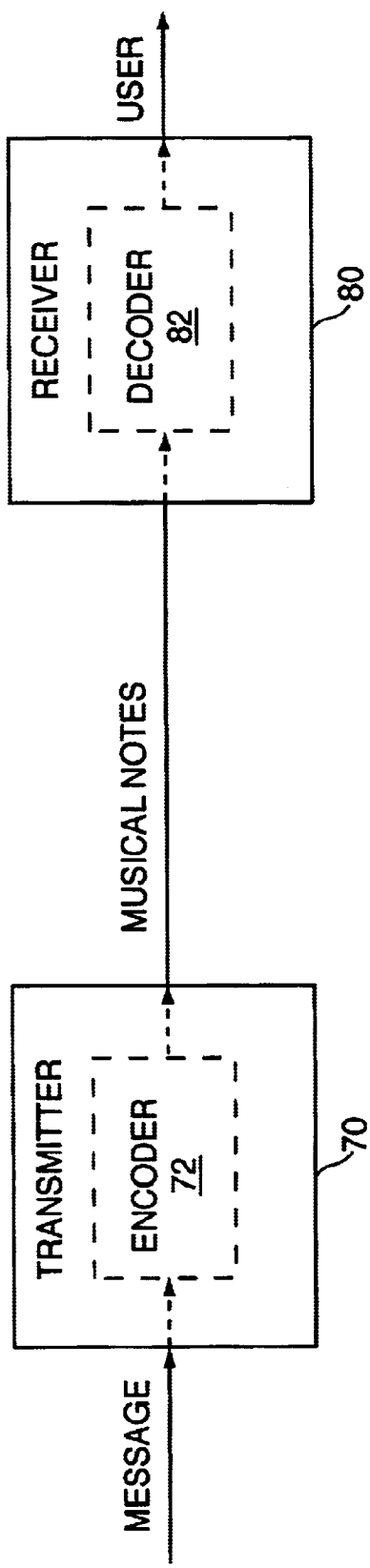
FIG. 4 is a block diagram of another embodiment of the present invention.

FIG. 4 illustrates another embodiment of the present invention. Transmitter 70 has encoder 72 which encodes a message into musical notes. Transmitter 70 then sends a musical message to receiver 80. Receiver 80 then decodes the musical notes in decoder 82 into an actual message and receiver 80 transmits the message to the user. In this way, the message is encoded and cannot be translated by the receiver without the specific code. This allows for secret messages to be transmitted back and forth.

Other obvious embodiments of the invention are possible. For example, beepers used to receive messages can each be programmed to play a unique musical note or melody based on the code punched in by the owner. This way, four Doctors playing bridge could easily distinguish their beep from that of the others when it called.

It will be understood that the claims are intended to cover all changes and modifications of the preferred embodiments of the invention herein chosen for the purpose of illustration which do not constitute a departure from the spirit and scope of the invention.

What is claimed is:

1. A method for communicating comprising:
   (a) assigning one musical note to each letter in an alphabet;
   (b) converting each letter in a word of a message to the assigned musical note; and
   (c) communicating said message to a human being using said musical notes.

2. The method of claim 1 wherein said alphabet is selected from the group consisting of Roman, Hebrew, Arabic, Greek, Russian and Sanskrit.

3. The method of claim 1 further comprising assigning musical notes to each Arabic integer 0 to 9.

4. The method of claim 1 further comprising assigning musical notes to each Roman numeral characters, I, V, X, L, C, D, and M.

5. The method of claim 1 wherein said alphabet is the Roman alphabet A to Z.

6. The method of claim 1 wherein said single frequency musical notes are selected from the notes corresponding to keys on a piano.

7. The method of claim 1 wherein said alphabet is the Roman alphabet A to Z and said musical notes correspond to notes emitted from keys on a piano keyboard.

8. A programmable telephone ringer device, comprising:
   an incoming telephone signal;
   means for receiving said incoming telephone signal;
   means for decoding said incoming telephone signal into a plurality of digits, wherein said decoding means is connected to said receiving means;
   means for generating a musical note corresponding to each of said plurality of digits, wherein said generating means is connected to said decoding means; and
   a speaker, connected to said generating means, for broadcasting said musical note.

9. The programmable telephone ringer device according to claim 8, wherein said generating means further comprises:
   temporary storage means for storing said plurality of digits, wherein said temporary storing means is connected to said decoding means;
   permanent storage means for storing a recorded sound corresponding to each of said digits; and
   a controller, connected to said permanent storage means and said temporary storage means, wherein said controller compares said digits with said corresponding digits in said permanent storage means, accesses said corresponding recorded sound, and transmits said recorded sound to said speaker.

10. The programmable telephone ringer device according to claim 9, further comprising a tone recorder circuit having means for accessing digits stored in said permanent storage means and means for recording unique sounds for*each of said accessed digits.

11. The programmable telephone ringer device according to claim 10 wherein said means for accessing digits stored in said permanent storage means is a keypad.

12. The programmable telephone ringer device according to claim 10 wherein said means for recording unique sounds is an external microphone.

13. The programmable telephone ringer device according to claim 10 wherein said means for recording unique sounds is an internal microphone.

14. A method for communicating comprising:
   a) assigning one musical note to each number from to 0 to 9;
   b) converting each number from 0 to 9 in a telephone number to the assigned musical note; and
   c) communicating said telephone number to a human being using said musical notes.

15. The method of claim 14 wherein said single frecuency musical notes are selected from the notes corresponding to keys on a piano.

16. A programmable telephone ringer device, comprising:
   an incoming telephone signal;
   means for receiving said incoming telephone signal;
   means for decoding said incoming telephone signal into a plurality of letters in an alphabet, wherein said decoding means is connected to said receiving means;
   means for generating a musical note corresponding to each of said plurality of letters, wherein said generating means is connected to said decoding means; and a speaker, connected to said generating means, for broadcasting said musical note.

17. The programmable telephone ringer device according to claim 16, wherein said alphabet is selected from the group consisting of Roman, Hebrew, Arabic, Greek, Russian and Sanskrit.

18. The programmable telephone ringer device according to claim 16, wherein said generating means further comprises:

temporary storage means for storing said plurality of letters, wherein said temporary storing means is connected to said decoding means;

permanent storage means for storing a recorded sound corresponding to each of said letters; and a controller, connected to said permanent storage means and said temporary storage means, wherein said controller compares said letters with said corresponding letters in said permanent storage means, accesses said corresponding recorded sound, and transmits said recorded sound to said speaker.

19. The programmable telephone ringer device according to claim 16, further comprising a tone recorder circuit having means for accessing letters stored in said permanent storage means and means for recording unique sounds for each of said accessed letters.

20. The programmable telephone ringer device according to claim 19, wherein said means for accessing letters stored in said permanent storage means is a keypad.

21. The programmable telephone ringer device according to claim 19, wherein said means for recording unique sounds is an external microphone.

22. The programmable telephone ringer device according to claim 19, wherein said means for recording unique sounds is an internal microphone.

* * * * *